UNITED STATES PATENT OFFICE.

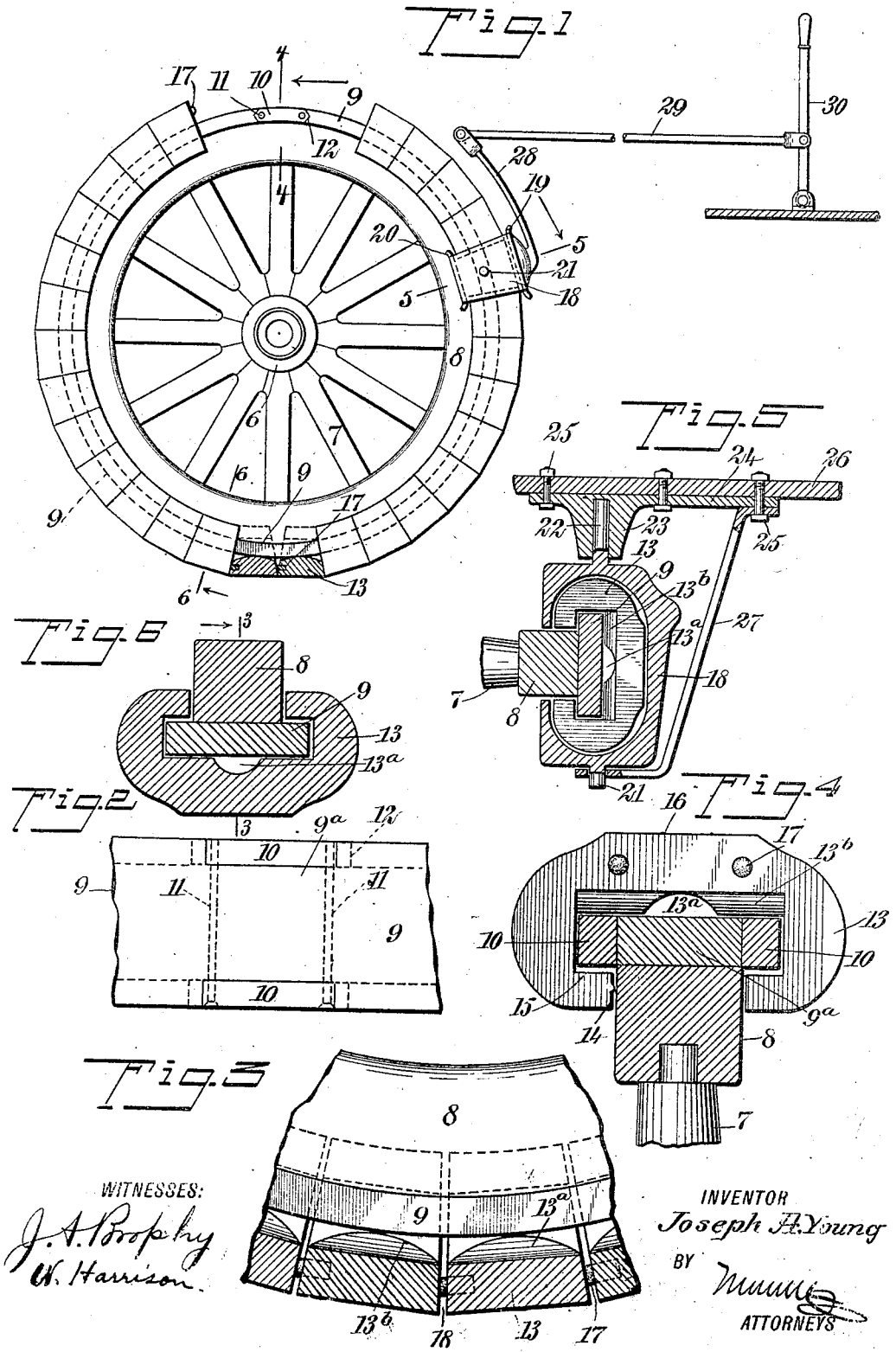

JOSEPH A. YOUNG, OF NEW YORK, N. Y.

NON-SLIPPING TIRE AND BRAKE.

No. 817,539.　　　Specification of Letters Patent.　　　Patented April 10, 1906.

Application filed May 12, 1905. Serial No. 260,152.

*To all whom it may concern:*

Be it known that I, JOSEPH A. YOUNG, a citizen of the United States, and a resident of the city of New York, borough of Brooklyn, in the county of Kings and State of New York, have invented a new and Improved Non-Slipping Tire and Brake, of which the following is a full, clear, and exact description.

My invention relates to vehicles, my more particular object being to produce a wheel provided with a tire constructed for the purpose of preventing slipping and provided with a brake peculiarly adapted for this form of tire.

Reference is to be had to the accompanying drawings, forming a part of this specification, in which similar characters of reference indicate corresponding parts in all the figures.

Figure 1 is a side elevation of the wheel and brake, embodying my invention, certain parts being broken away for the sake of clearness. Fig. 2 is a fragmentary plan view of the tire, showing means whereby the segmental shoes may be mounted in position. Fig. 3 is a fragmentary elevation, enlarged, showing the bottom portion of the tire, the segmental shoes being shown partly in section on the line 3 3 of Fig. 6. Fig. 4 is an enlarged section upon the line 4 4 of Fig. 1, looking in the direction of the arrow and showing the manner in which the segmental shoes are mounted. Fig. 5 is an enlarged section upon the line 5 5 of Fig. 1 looking in the direction of the arrow and showing the brake together with its mountings, and Fig. 6 is an enlarged fragmentary section upon the line 6 6 of Fig. 1 looking in the direction of the arrow and showing the construction of one of the segmental shoes.

The hub of the wheel is shown at 6, the spokes at 7, the felly at 8, and a tire at 9. This tire is provided with a comparatively narrow portion or neck $9^a$, upon each side of which are fitted blocks 10, secured thereto by means of bolts 11, passing entirely through the blocks and through the neck $9^a$. The blocks 10 are each provided with dowel corners 12, which retain them in proper relation to the tire. Threaded upon the tire 9 are a number of segmental shoes 13, each provided with a convex surface $13^b$, having an aperture $13^a$, as indicated in Figs. 3, 4, and 5. This aperture is for the purpose of preventing the accumulation of dirt within the several shoes. Any dirt which tends to accumulate therein is free to roll down through the apertures and make its escape. The apertures also serve to divide the bearing-surface upon opposite sides of a common line, and this renders the shoes less liable to the effects of friction. Each segmental shoe 13 is further provided with a slot 14 a little wider than the thickness of the felly 8, as indicated in Fig. 4, and is also provided with a recess 15, into which the slot 14 merges. This recess 15 is of such size as to fit loosely upon the tire. Each segmental shoe 13 is provided also with a tread-surface 16 and with cushions 17, which serve as buffers to prevent undue noise and shock, which might otherwise ensue from adjacent segmental shoes knocking together. The brake-shoe is shown at 18 and is provided with gripping-surfaces 19 20 and with journals 21 22. The journal 22 works in a bearing 23, carried by a bearing-plate 24, the latter being held by bolts 25 upon a portion 26 of the vehicle. A bracket 27 engages the journal 21 and assists in supporting the brake-shoe 18. Rigidly connected with the brake-shoe 18 is an arm 28, and pivoted to this arm is a pitman 29, connected with a brake-lever 30, controllable by hand in the usual manner. The tire is of equal width throughout its entire circumference notwithstanding the presence of the blocks 10—that is to say, these blocks being let simply into the tire, as indicated in Fig. 2, the width of the tire is thus rendered uniform. This width is considerably greater than the width of the felly 8, as indicated in Fig. 4, so that the segmental shoes 13 when their recesses 15 partially encircle the tire are not only held loosely upon the tire, but are each maintained in a predetermined proximate relation thereto. The number of the segmental shoes is such as to slide on about seven-eighths of the tire, the remaining portion appearing exposed, as indicated in Fig. 1.

The operation of my device is as follows: When the wheel rolls forward or backward, the tire 9 presses tightly upon the convex surface $13^b$ of such of the shoes as happen to be in engagement with the ground. The curvature of the portion $13^b$ being convex and the outer periphery of the tire 9 being also convex, it follows that the motion of the tire relatively to the shoe is a sort of rolling motion. The wheel as a whole thus has a limited movement relatively to the shoe or shoes which happen to engage the ground at a particular moment. At least one of the shoes 13 has its tread-surface in actual contact with the ground at all times. During a part of the time two shoes are in direct engagement with the ground, each shoe throughout its entire tread-surface pressing directly upon the ground. Referring to Fig. 1, it will be seen that as one shoe is placed flatly upon the ground another is removed therefrom. In this way a flat and broad surface is always presented to the ground, slipping being thereby prevented. As the wheel turns the several segmental shoes 13 in arriving at the top of the wheel slide along the bare or exposed portion of the tire and strike upon the adjacent shoes. The cushions 17, serving as buffers, prevent undue shock or danger of breaking of the shoes and also prevent excessive noise due to striking the shoes together. As each of the segmental shoes 13 is moved apart from the others in its revolution, no dirt can accumulate between the shoes.

Theoretically considered, the action of the wheel as a whole may be analyzed as follows: Each segment rests upon the ground, and the tire of the wheel moves upon this segment, considered as a center, until another segment rests upon the ground, the weight of the wheel momentarily resting upon the two shoes, and then the second shoe becomes a center upon which the wheel as a whole moves. This action involves the well-known principle that the top of a vehicle-wheel travels faster through space than the bottom of the same. The gripping members 18 19 of the brake-shoe 18 normally offer no resistance to the movement of the sector-like shoes 13; but when the brake-lever 30 is thrown forward, so that the brake-shoe 18 is tilted, one or more of the sector-like shoes 13 are turned askew, so as to bind upon the tire 9 and cause the same to stop. The slipping takes place inside of the sector-like shoes 13 between the inner surface thereof and the tire 9.

Having thus described my invention, I claim as new and desire to secure by Letters Patent—

1. The combination of a wheel provided with a felly and with a tire wider than said felly, and a plurality of sector-like shoes each partially encircling said tire, said shoes being loose relatively to said tire.

2. The combination of a wheel and a plurality of shoes disposed loosely upon the periphery thereof and disconnected from each other, said shoes being provided with tread portions for engaging the earth and with bearing portions for engaging said wheel.

3. The combination of a wheel provided with a tire and a plurality of sector-like shoes entirely disconnected from each other and loosely connected with said tire, each of said shoes having a convex bearing-surface for engaging said tire, and having means whereby it is maintained in proper working relation to said tire.

4. The combination of a wheel, shoes mounted loosely thereupon and movable relatively thereto for the purpose of forming a tread for said wheel, said shoes being disconnected from each other and adapted to move apart by gravity at the upper portion of the wheel.

5. The combination of a wheel provided with a felly and with a comparatively wide tire, sector-like shoes each provided with a slot slightly wider than said felly and with a recess slightly wider than said tire, each of said shoes being further provided with a tread portion, and means for cushioning the movements of said shoes relatively to each other.

6. The combination of a tire provided with a comparatively narrow portion, blocks connected with said tire for the purpose of filling said portion, said blocks being flush with the edges of said tire, and shoes to be threaded upon said tire, said shoes each being provided with a slot slightly wider than said narrow portion of said tire.

7. The combination of a wheel provided with a tire, a sector-like shoe provided with a convex portion for engaging said tire and with a portion for partially encircling said tire in order to roll said shoes thereupon, and means for placing said shoes upon said tire and for removing the same therefrom.

8. The combination of a wheel provided with a plurality of separate shoes mounted loosely upon its periphery and movable bodily in relation to said wheel, and a brake for engaging said shoes so as to cause the same to bind upon said wheel and check the rotation thereof.

9. The combination of a wheel provided with a tire, shoes loosely mounted upon said wheel and loosely engaging said tire, and brake mechanism for engaging said shoes, thereby causing the same to check the movements of said tire.

10. The combination of a wheel provided with a tire, shoes mounted loosely upon said tire and slidable in relation thereto, a brake partially encircling said shoes so as to cause the same to bind upon said tire, and means for actuating said brake.

In testimony whereof I have signed my name to this specification in the presence of two subscribing witnesses.

JOSEPH A. YOUNG.

Witnesses:
  THOMAS H. IRELAND, Jr.,
  FRANK WRIGHTMAN.